Feb. 11, 1969    J. KIRCHGASSER    3,426,410
METHOD AND APPARATUS FOR THE MANUFACTURE OF A CIRCULAR
SPRING FROM A STRAIGHT HELICAL TENSION SPRING
Filed Aug. 29, 1966    Sheet 1 of 3
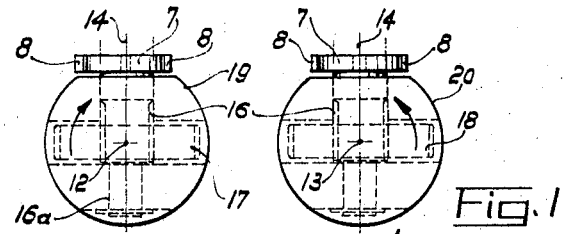
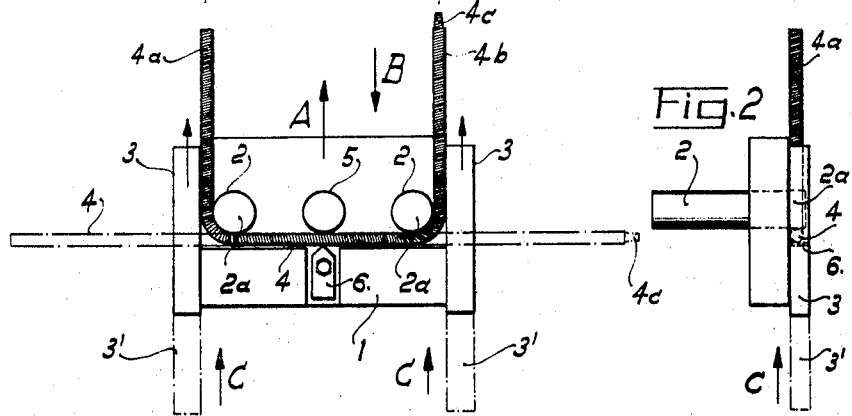
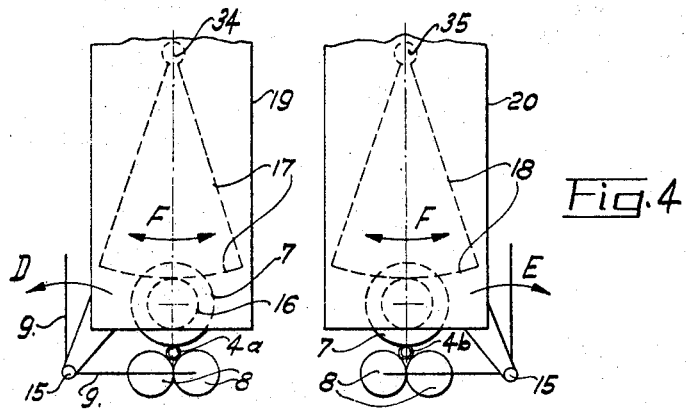
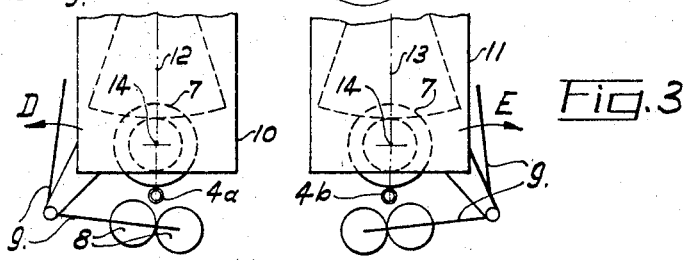
INVENTOR.
JAKOB KIRCHGÄSSER
BY
Woodhams, Blanchard & Flynn
ATTORNEYS

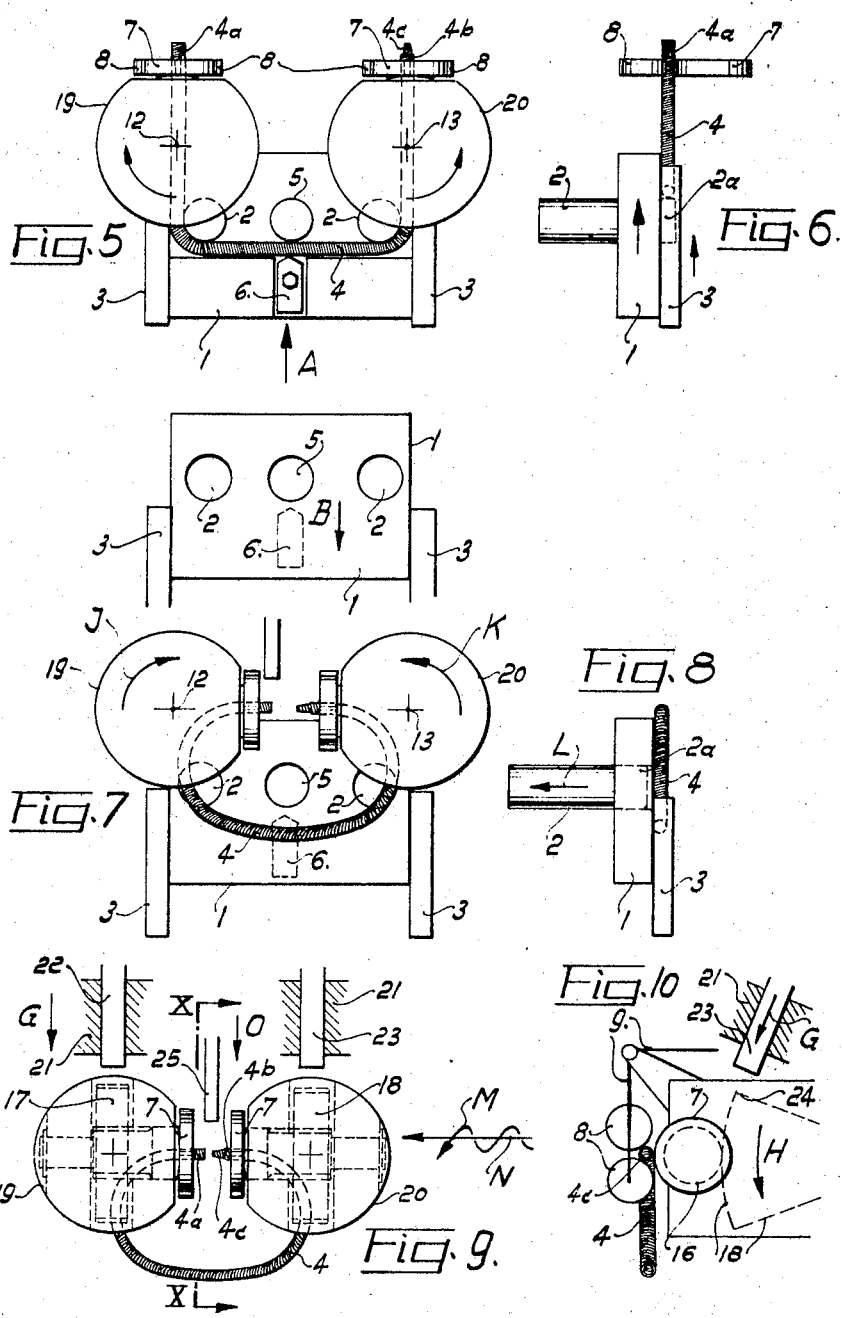

United States Patent Office 3,426,410
Patented Feb. 11, 1969

3,426,410
METHOD AND APPARATUS FOR THE MANUFACTURE OF A CIRCULAR SPRING FROM A STRAIGHT HELICAL TENSION SPRING
Jakob Kirchgasser, Gustav Kirchhoffstr 18, Heidelberg, Germany
Filed Aug. 29, 1966, Ser. No. 575,814
Claims priority, application Germany, Sept. 1, 1965, K 57,022
U.S. Cl. 29—173   16 Claims
Int. Cl. B21f 35/02; B23p 15/00, 19/00

ABSTRACT OF THE DISCLOSURE

A process and apparatus for the manufacture of a circular spring from a straight helical tension spring having a cut-back slightly conical end. The straight tension spring is initially bent into a U-shape, whereupon the ends of the spring are inserted into clamping devices and firmly clamped therein. The clamping devices are then swung through 180° relative to one another to locate the spring ends opposite one another. The spring ends are then rotated relative to one another and are pushed one into the other and screwed together by relative rotation therebetween in the opposite direction.

---

This invention relates to a process and a device for the manufacture of a circular spring from a straight helical tension spring having a cut-back slightly conical end. The straight helical tension spring required for this circular spring may be made on an automatic machine; previously, however a circular spring could be made only by hand. Such circular springs, which have many uses in technology, for example as annular springs for shaft seals, are required to have a diameter of the circle of about 8 mm.–100 mm., a diameter of the spring cross section of about 1.3–2.5 mm. and wire thickness of about 0.15–0.18 mm. Hitherto, manufacture of a circular spring by hand from a straight helical spring required a large number of operations. The manufacture of very small circular springs of for example only 8 mm. ring diameter by hand is very difficult and indeed hardly possible. The fact is that the screw connection of the two ends of the helical spring by hand is dependent on the skill of the operator, so that this connection is unreliable, hence these circular springs may subsequently open in use.

The object of the present invention is to provide an automatic device for the manufacture of such circular springs. The process of manufacture underlying this device includes the steps, in accordance with the invention, that the straight tension spring is bent into U-form, thereupon the ends of the parallel limbs of the spring are each inserted into a clamping device and firmly clamped therein, thereupon these clamping devices are swung through 180° relatively to one another in such manner that the ends of the spring are located opposite one another, and thereupon, by means of the two clamping devices, the two ends of the spring are rotated relatively to one another, pushed together and then screwed one into the other by relative rotation thereof in opposite directions.

Figure 11:
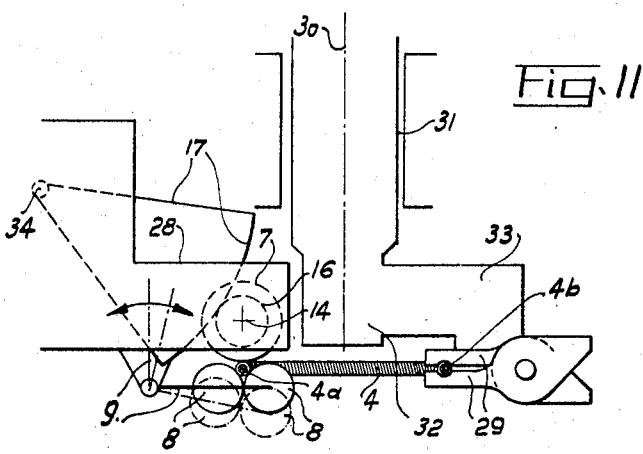
Figure 12:
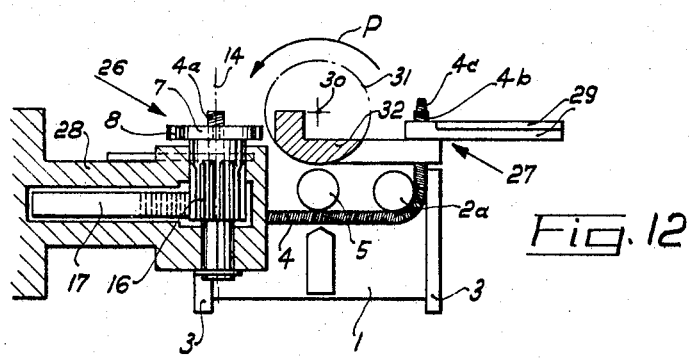
Figure 13:
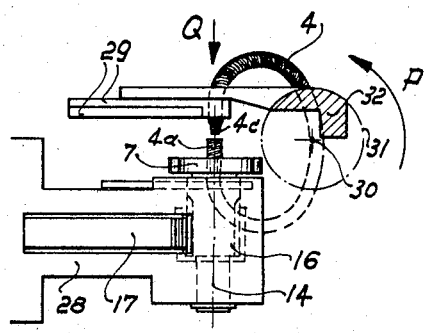

In order that the invention may be clearly understood and readily carried into effect it will now be described by way of example with reference to the accompanying drawings, in which FIGURE 1 is a plan view of a bending device and two clamping devices, FIGURE 2 is a side view of the bending device, FIGURE 3 is a front view of the two clamping devices in the open condition, FIGURE 4 is a view similar to FIGURE 3 but showing the clamping devices in closed condition, FIGURES 5, 7 and 9 are plan views of the bending and clamping devices shown in FIGURE 1, shown in successive operative positions, FIGURES 6 and 8 are side views corresponding to FIGURES 5, 7 and 9, FIGURE 10 is a section on the line X—X of FIGURE 9, FIGURE 11 is a front view of two clamping devices of another embodiment of the invention, FIGURE 12 is a horizontal section through two clamping devices, and FIGURE 13 is a plan view of the clamping devices in a further operating position.

In FIGURES 1 and 2 the bending device used in the novel process consists of a horizontal slide 1 movable in the directions A and B, two bending pins 2 which are movable vertically in this slide and in the initial position illustrated project beyond the slide at the ends 2a, and two slides 3 arranged laterally of the slide 1, being movable together and with the slide 1. The arrangement is such that in the withdrawn setting of the slides indicated by broken lines at 3' the straight helical tension spring 4, which has a cut-back slightly conical end 4c, lies on the slide 1 in front of the two pins 2, as shown by dot-dash lines. This spring may be fed automatically to the slide from a reservoir by means of a suitable device. By forward movement of the slides 3 in the direction C the spring 4 is bent around the ends 2a of the pins into the U-shape illustrated, which has two parallel limbs 4a, 4b.

In the advantageous construction shown there is also provided a third pin 5 arranged centrally between the two bending pins 2 and likewise movable vertically in the slide 1, the pin 5 forming together with a wedge-shaped clamping member shown at 6 a clamping device which holds the spring centrally prior to and during the bending operation and hence prevents undesired movement of the spring.

This spring, bent into U-shape is now fed in the direction A to two similar clamping devices by combined movement of the slide 1 and the two slides 3, so that as shown in FIGURES 5 and 6 the two limbs 4a, 4b of the spring extend into the clamping devices which are shown in FIGURE 3 as open.

These clamping devices, which serve not only for clamping the ends of the spring but also for rotating them, each consist, in accordance with the invention of a relatively large driving roller 7 which can be driven in both directions of rotation and two relatively small counter rollers 8 which can move together relative to the driving roller 7 in such manner that as shown in FIGURE 3 the ends 4a, 4b of the spring are inserted between the three rollers 7, 8, are clamped by these as shown in FIGURE 4 and can then be rotated by the driving roller. As is shown diagrammatically in the drawing, the two counter rollers 8 are each mounted in an angular pivoted lever 9. In the embodiment of the invention illustrated in FIGURES 1 to 10, the driving roller 7 and the pivoted lever 9 are mounted on pivoted heads 10 and 11 respectively, the pivot axes 12 and 13 of which are at right angles to the axle 14 of the driving roller 7. As shown in FIGURES 3 and 4, upon swinging the lever 9 in the direction D and E around the axes 15 the counter rollers 8 are pressed against the driving roller 7 and the ends 4a, 4b of the spring are clamped firmly between the rollers 7, 8. In order to effect reliably the relative rotation of the two ends 4a, 4b of the spring as is required for carrying out the new process, rough driving rollers 7 capable of gripping are required. For this purpose the peripheral layer of these driving rollers engaging the ends of the spring is preferably made from diamond dust. Upon rotation of these driving rollers reliable entraining of the ends 4a, 4b of the spring in a rolling operation is produced, and hence rotation of these ends through a quite definite amount is possible. These driving rollers treated with diamond dust have the further advantage of high resistance to wear.

As can be seen from the drawing, each driving roller is firmly connected to a pinion 16 with which engages a toothed segments 17, 18 respectively which can be driven in both directions of rotation F. In the construction shown in FIGURES 1 to 10 the above-mentioned pivotal heads 10, 11 form the lower ends of cylindrical shafts 19, 20 pivotal about the axes 12 and 13 respectively. As is shown in the drawing, the pinion 16 that drives the roller 7 is mounted within the associated cylindrical shaft 19 or 20 and the driving roller is mounted laterally thereof, the toothed segments 17 and 18 that engage the pinions also being mounted in the associated shaft 19 or 20. As shown in FIGURES 9 and 10, there are provided for swinging the two toothed segments 17, 18 tappets 22, 23 respectively which are mounted for longitudinal movement in guides 21 and can be moved to and fro by means of a suitable driving mechanism, e.g. a cam disc. In its forward movement in the direction G each tappet strikes against the associated toothed segment at 24 and swings this in the direction H, the return movement of the toothed segment in the opposite direction being effected by means of a spring.

The operation of the above-described device is as follows.

After the straight spring 4 has been bent into U-shape form as above described with reference to FIGURES 1 and 5 and the ends 4a, 4b of the spring have been introduced between the clamping rollers 7, 8 and firmly clamped, as shown in FIGURE 7 the two shafts 19 and 20 carrying the clamping rollers are each turned through 90°, hence 180° relative to one another in the directions I and K respectively, so that the two ends 4a and 4b of the spring are now located opposite one another. As shown in FIGURES 5 and 7 the U-shaped spring is thereby shaped into a ring, which is still open. So as not to obstruct this shaping operation, as shown in FIGURE 8 the bending pins 2 are pulled downwardly in the direction L so that the ends 2a of the pins no longer project beyond the slide 1.

In order to form the circular spring the cut-back end 4c of the spring must now be screwed into the end 4a of the spring. It may be assumed in this connection and as shown in FIGURE 1 that the spring is wound right-hand, so that the ends 4a and 4c of the spring have right-hand windings, which serve as screw threads. If for example the end 4c of the spring has four turns of wire then about four rotations will be necessary for screwing this end of the spring into the other end 4a. For this purpose, as shown in FIGURES 9 and 10 the end 4b, 4c of the spring is rotated backwardly through two rotations, i.e. in the direction of the arrow M in anti-clockwise direction by means of the toothed segment 18 and the associated driving roller 7 (as above described). At the same time the end 4a of the spring is rotated through two rotations in the opposite direction, i.e. in clockwise direction (seen in the direction of the arrow N) by means of the toothed segment 17. Thereupon the shaft 20, which may be mounted in a horizontal slide (not illustrated) is moved in the direction N so that the end 4c of the spring is introduced into the end 4a of the spring. When the two ends of the spring have been interengaged the shaft 20 moves through a rotation of the end 4b, 4c of the spring equal to the thickness of the wire. At the same time the two toothed segments 17 and 18 are moved in the opposite direction so that the end 4c of the spring is now moved in clockwise sense in relation to the arrow 9, and the end 4a of the spring is moved in the opposite sense, each being given two rotations. In this way the two ends 4a, 4c of the spring are firmly screwed together so that the circular spring is completed. Following release of the two clamping rollers 7, 8 by swinging the levers 9 this circular spring is ejected from the opened clamping rollers 7, 8 in the direction O by the movement of an ejector 25.

While in the above-described device the two clamping roller devices are each swung through 90° by means of the shafts 19, 20, in the embodiment of the invention illustrated in FIGURES 11–13 the process according to the invention is carried out by holding one end 4a of one limb of the U in a first stationary clamping device 26, the other end 4b of the other limb of the U being swung through 180° in the direction of the arrow P by means of a second clamping device 27, and as shown in FIGURE 13 it is moved towards the stationary end 4a of the spring while the relative rotation of the two ends 4a, 4b of the spring is effected only by the first clamping device 26. For this purpose, as shown in the drawing, a stationary clamping roller device 7, 8 carried by an arm 28 is provided as already described for holding one end 4a of the spring, and any suitable second clamping device 27, consisting for example of the scissors clamp comprising the two clamping arms 29, is provided for holding the other end 4b of the spring. In order to swing this scissors clamp there is provided a shaft 31 which can pivot about a vertical axis 30 and the lower end 32 of which is of angular profile as shown in FIGURE 12 and has an arm 33 which carries the scissors clamp 29. After the straight spring 4 has been bent into U-shape as described with reference to FIGURE 1, its ends 4a, 4b are introduced into the clamping rollers 7, 8 and the scissors clamp 29 by means of slide 1 and slides 3, and the ends 4a, 4b are firmly clamped. Thereupon, as shown in FIGURE 13 the scissors clamp is pivoted through 180° by swinging the shaft 31, so that the two ends 4a, 4c of the spring are now located opposite one another. If, for example, the end 4c of the spring has four turns of wire, hence four screw threads, then the end 4a of the spring is turned backwards by four rotations by means of the toothed segment pivotal about the axis 13, the pinion 16 and the driving roller 7. Then the shaft 31 is moved in the direction of the arrow Q, so that the end 4c of the spring is introduced into the end 4a of the spring. As soon as the end 4c has been engaged by the end 4a, by oppositely directed movement of the toothed segment 17 the end 4a of the spring is rotated forwards through four rotations and is thereby screwed onto the end 4c of the spring which is held stationary in the clamp 29.

It will be seen from FIGURES 11 to 13 that this arrangement permits of a structure of very small dimensions, so that circular springs of very small diameter may preferably be manufactured with this device.

The devices described, in accordance with the invention, have the important advantage that circular springs of different diameters can be manufactured with one and the same device. For this purpose it is only necessary to insert into the bending device a straight helical spring the length of which corresponds to the required diameter of the circular spring.

I claim:

1. Process for the manufacture of a circular spring from a straight helical tension spring having a cut-back slightly conical end, wherein the straight tension spring is bent into a U-shape, thereupon the ends of the parallel limbs of the U-shaped spring are inserted into respective clamping devices and firmly clamped therein, these clamping devices are swung through 180° relative to one another in such manner that the ends of the spring are located opposite one another, whereupon the two ends of the spring are rotated relative to one another by means of the two clamping devices, are pushed one into the other and screwed together by relative rotation in opposite directions.

2. Process according to claim 1 wherein both clamping devices are swung through 90°.

3. Process according to claim 2 wherein prior to the bringing together of the ends of the U-shaped spring each of the two clamping devices is rotated by the same amount and after the ends of the U-shaped have been brought together each clamping device is rotated by the same amount in the opposite direction.

4. Process according to claim 1 wherein one end of the U-shaped spring is firmly held in a first stationary clamping device, and the other end of the U-shaped spring is swung through 180° by means of a second clamping device and is moved towards the stationary end, and the relative rotation of the ends of the spring is effected only by means of the first clamping device.

5. Device according to claim 16, wherein one of said clamping devices that serves for firmly clamping and rotating one end of the spring comprises a driving roller of relatively large diameter which can be driven in both directions of rotation and two counter rollers of relatively smaller diameter which are mounted so as to be movable together relative to the driving roller in such manner that an end of the spring can be inserted between the three rollers, firmly clamped by them and rotated by the driving roller.

6. Device according to claim 5 wherein the peripheral layer of the driving roller acting on the end of the spring consists of diamond dust.

7. Device according to claim 5 wherein the two counter rollers are mounted on one swinging lever.

8. Device according to claim 7 wherein the driving roller and the swinging lever are mounted on a swinging head the axis of swinging of which is at right angles to the rotational axis of the driving roller.

9. Device according to claim 5 wherein said means for causing relative rotation between the ends of said spring includes a pinion connected to said driving roller for rotating same and a toothed segment in driving engagement with said pinion with said toothed segment being driveable in both angular directions.

10. Device according to claim 9 wherein the means for swinging the clamping devices through 180° relative to one another includes a cylindrical shaft which is mounted for pivotal movement about its longitudinal axis, and wherein the pinion is mounted within the cylindrical shaft and the driving roller is mounted laterally of said shaft, and the toothed segment that engages the pinion is mounted in the shaft.

11. Device according to claim 10 wherein for the purpose of swinging the toothed segment a tappet is provided which is mounted for longitudinal movement and can be moved to and fro by means of driving means and which in its forward movement strikes against the toothed segment and swings it in one direction, the return swinging movement of the toothed segment being effected by spring action.

12. Device according to claim 16, wherein said means for bending said straight spring into a substantially U-shape includes a horizontally reciprocable slide, two bending pins movable vertically in this slide and projecting beyond it in their initial positions, and two slides which are arranged laterally of the first-mentioned slide and are movable together and with the first-mentioned slide, the arrangement being such that when the two slides are withdrawn the straight spring lies on the first-mentioned slide in front of the ends of the two pins, and is then bent into a U-shape around the two ends of the pins by forward movement of the two slides.

13. Device according to claim 11 including a third pin arranged centrally between the two bending pins and movable vertically in said first-mentioned slide, and a wedge-shaped clamping member cooperating with the third pin for holding the spring stationary and centrally during the bending operation.

14. Device according to claim 16, wherein said clamping means includes a stationary clamping roller device for holding one end of the spring and a suitable clamping device for holding the other end of the spring, the latter being capable of being swung through 180° and then movable towards the clamping roller device.

15. Process according to claim 1, wherein one end of the U-shaped spring is firmly held in a first stationary clamping device and the other end of the spring is swung through 180° by means of a second clamping device so as to position said other end adjacent said one end.

16. A device for the manufacture of a circular spring from a straight helical tension spring having a cut-back slightly conical end, comprising:
  means for bending said straight tension spring into a U-shape having a pair of substantially parallel limbs;
  clamping means including a pair of clamping devices adapted for receiving the ends of said limbs therein for firmly clamping same;
  means for inserting the ends of the pair of limbs of the U-shape spring into said clamping devices;
  means for causing relative movement between said clamping devices through an angle of approximately 180° so as to position the ends of said spring substantially opposite one another;
  means for causing relative rotation between the ends of said spring in a first direction; and
  means for pushing one of said ends into the other of said ends and for causing relative rotation between said ends in the opposite direction so as to cause said ends to be screwed together.

References Cited

UNITED STATES PATENTS 2,610,078  9/1952  Risley et al. _____ 29—525 X
3,359,617  12/1967  Baumler _____ 29—173

THOMAS H. EAGER, *Primary Examiner.*

U.S. Cl. X.R.

29—428, 200, 227